(12) United States Patent
Rauscher et al.

(10) Patent No.: US 9,971,569 B2
(45) Date of Patent: May 15, 2018

(54) GENERATING OBJECT MODEL VALIDATION RULES

(71) Applicant: International Business Machines Corporation, Armonk, NY (US)

(72) Inventors: Phillip M. Rauscher, Charlottesville, VA (US); Ossama Shokry, Giza (EG)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 15/041,470

(22) Filed: Feb. 11, 2016

(65) Prior Publication Data

US 2017/0235549 A1    Aug. 17, 2017

(51) Int. Cl.
*G06F 9/44* (2006.01)
*G06Q 10/00* (2012.01)

(52) U.S. Cl.
CPC .......... *G06F 8/24* (2013.01); *G06F 8/10* (2013.01); *G06F 8/35* (2013.01); *G06Q 10/00* (2013.01)

(58) Field of Classification Search
CPC ........... G06F 8/20; G06Q 10/06; G06Q 10/10
USPC ........................................................ 717/102
See application file for complete search history.

(56) References Cited

U.S. PATENT DOCUMENTS

| | | |
|---|---|---|
| 7,865,480 B2 | 1/2011 | Bussler et al. |
| 8,280,919 B2 | 10/2012 | Krishnaswamy et al. |
| 2005/0125806 A1* | 6/2005 | Bussler ................. G06F 9/4433 719/316 |
| 2006/0129605 A1* | 6/2006 | Doshi ....................... G06F 8/24 |
| 2008/0222611 A1 | 9/2008 | Sharma |
| 2010/0174687 A1* | 7/2010 | Krishnaswamy ... G06F 9/44589 707/690 |
| 2012/0136806 A1* | 5/2012 | Anderson ......... G06F 17/30554 705/36 R |
| 2012/0198281 A1 | 8/2012 | Weinberg |
| 2012/0272221 A1 | 10/2012 | Pessoa et al. |
| 2013/0238384 A1* | 9/2013 | Caesar ...................... G06F 8/34 705/7.27 |
| 2014/0165043 A1* | 6/2014 | Pasala ................ G06Q 10/0633 717/124 |
| 2015/0089345 A1 | 3/2015 | Marimuthu et al. |
| 2015/0120397 A1* | 4/2015 | Vissapragada ....... G06Q 10/067 705/7.36 |
| 2015/0242389 A1* | 8/2015 | Morrissey ......... G06F 17/30371 715/237 |

(Continued)

FOREIGN PATENT DOCUMENTS

| | | |
|---|---|---|
| EP | 2639693 A1 | 9/2013 |
| WO | 2015033130 A1 | 3/2015 |

OTHER PUBLICATIONS

Hatch, "kalani/validation-rule-generator", Packagist, Aug. 4, 2013, Printed Jan. 13, 2016, 5 pages, <https://packagist.org/packages/kalani/validation-rule-generator>.

(Continued)

*Primary Examiner* — John Chavis
(74) *Attorney, Agent, or Firm* — Gilbert Harmon, Jr.

(57) ABSTRACT

Embodiments of the present invention provide a method, computer program product, and computer system for generating object model validation rules. The method includes receiving an object model and generating a first field structure. A second field structure is generated based on the first field structure. A set of validation rules is then generated based on the second field structure.

19 Claims, 5 Drawing Sheets

(56) References Cited

U.S. PATENT DOCUMENTS

2015/0356069 A1* 12/2015 Baldwin ............. G06F 17/2247
    715/237
2017/0180322 A1* 6/2017 Agarwal ............. H04L 63/0263

OTHER PUBLICATIONS

Jijoel, "validation-rule-generator", GitHub, Aug. 4, 2013, Printed Jan. 13, 2016, 3 pages, <https://github.com/iijoel/validation-rule-generator>.

Microsoft asp.net Team, "Build a Model with Business Rule Validations", asp.net, Jul. 27, 2010, 13 pages, <http://www.asp.net/mvc/overview/older-versions-1/nerddinner/build-a-model-with-business-rule-validations>.

"Defining Validation and Business Rules Declaratively", Fusion Middleware Fusion Developer's Guide for Oracle Application Development Framework, 11g Release 1 (11.1.1), 15 pages, Dec. 2009, © 2015, Oracle and/or its affiliates, <http://docs.oracle.com/cd/E15523_01/web.1111/b31974/bcvalidation.htm#ADFFD396>.

* cited by examiner

GENERATING OBJECT MODEL VALIDATION RULES

BACKGROUND OF THE INVENTION

The present invention relates generally to the field of business rule management systems, and more particularly to generating object model validation rules to be used by business rule management systems.

A business rule management system (BRMS) is a software system used to define, deploy, execute, monitor, and maintain the variety and complexity of decision logic that is used by operational systems within an organization or enterprise. This logic, also referred to as business rules, includes policies, requirements, and conditional statements that are used to determine the tactical actions that take place in applications and systems.

Some software applications contain object models that need to be filled, for example, a user profile input form, or a graphical user interface (GUI). Validation of these object models require determining that mandatory data fields are filled in and extend to complex conditional validation of the contents of the data field. One way of extracting the validation logic from application code is to use a BRMS to capture the business rules that validate the object model. For each data field in the object model, one or more business rules (hereinafter "validation rules"), need to be written to check the validity of this data field. Examples of these checks may include (but are not limited to) the following: determine whether the field is visible on the GUI; determine whether the field is required (i.e., must be filled); flag a validation error if a required field is left blank; and flag a validation error if the contents of the field are wrong (e.g., a percentage greater than 100%). The validation rules are developed inside a decision service (hereinafter "validation service). An instance of the object model is passed as an input parameter to the validation service. The validation rules are applied to the object model instance. The validation service then returns the validation results in its output parameter. The validation results can contain (but are not limited to) the following: determine whether the field must be visible on the GUI; determine whether the field required; and validation error messages (i.e., declare that a required field was left blank).

SUMMARY

A method, computer program product, and computer system for generating object model validation rules, comprising: receiving, by one or more computer processors, an object model; generating, by one or more computer processors, a first field structure; generating, by one or more computer processors, based, at least in part, on the generated first field structure, a second field structure; and generating, by one or more computer processors, based, at least in part, on the generated second field structure, a set of validation rules.

DETAILED DESCRIPTION

Validation rules can be manually developed in a BRMS system. However, this is a cumbersome and error-prone process. The BRMS developer must inspect the object model carefully and develop the needed validation rules for each single data field in the object model. This leads to errors, such as overlooked fields. With a large object model the manual development of the validation rules can take too much time. It also involves repetitive work since there may be similarities amount the validation rules. Furthermore, the BRMS developer will need to carefully build a hierarchical structure of rule packages to keep the validation rules organized. This makes the task of developing the validation rules unpleasant and costly to the BRMS developer. Embodiments of the present invention provide systems and methods for parsing an object model and generating the corresponding validation rules in a hierarchical structure of rule packages that reflects the structure of the object model.

Figure 1:
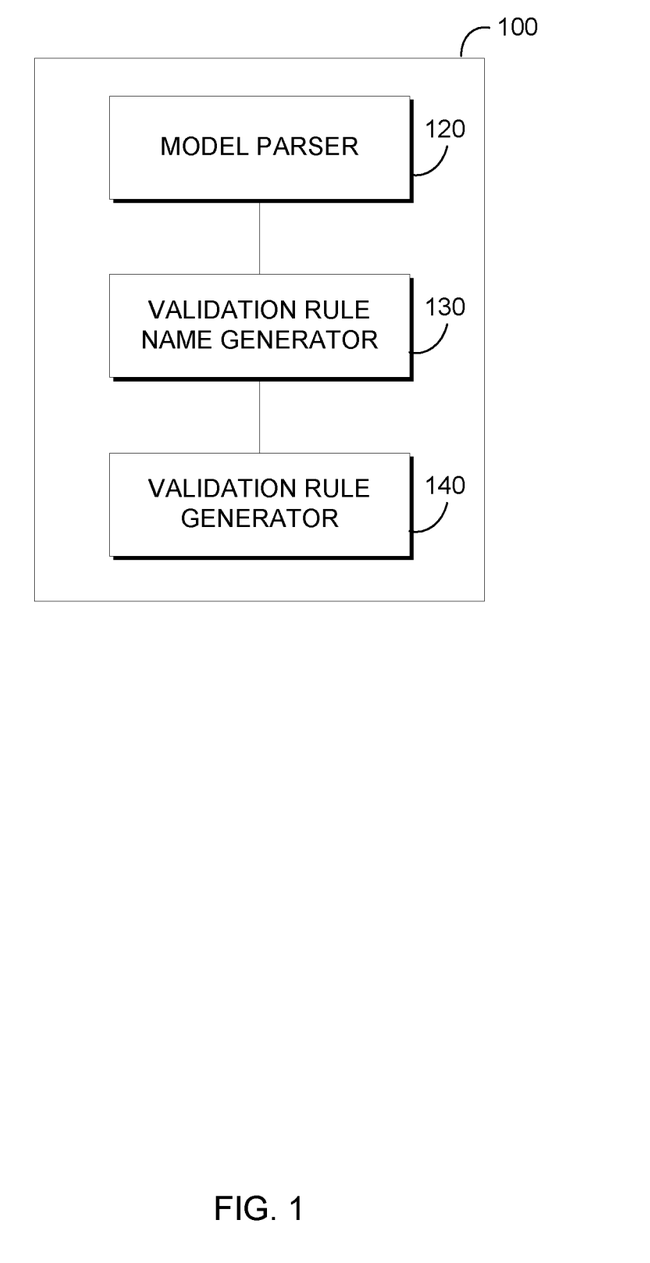
FIG. 1 is a functional block diagram illustrating a computing device, in accordance with an embodiment of the present invention.

The present invention will now be described in detail with reference to the figures. FIG. 1 is a functional block diagram illustrating computing device 100, in accordance with one embodiment of the present invention. FIG. 1 provides only an illustration of one implementation, and does not imply any limitations with regard to the environments in which different embodiments may be implemented. Many modifications to the depicted environment may be made by those skilled in the art without departing from the scope of the invention as recited by the claims. In an exemplary embodiment, computing device 100 includes model parser 120, validation rule name generator 130, and validation rule generator 140. It should be appreciated that in various embodiments, components of computing device 100 can be located on a single device or they can be located on several devices communicating over a network.

Model parser 120 parses the object model. Model parser 120 iterates on the contents of the object model and identifies all the data fields in the object model. Each field is uniquely identified by an identification, hereinafter called the field key.

Validation rule name generator 130 receives the parsed object model along with the corresponding field keys and generates a user friendly name to the validation rule for this field. The name is based on the field name from the object model and the type of validation being performed. For example, for a data field Customer.fullName, a validation rule name can be generated as "Validate Customer Full Name." A rule that sets the visibility of the same would get its name generated as "Set Customer Full Name Visibility."

Validation rule generator 140 generates, for each data field, a validation rule to perform the needed check on the data field and add a validation error message to the validation service output parameter if a validation error was detected. Validation rule generator 140 generates the validation rules for all data fields in the object model in an organized way. For example, for each package in the object model, a rule package will be generated. The validation rules for all fields within classes under the object model package will be generated under the corresponding rule package. It should be appreciated that the implementation of the present invention as described herein creates two rules for each data field: one rule to determine whether or not the field is visible on the user interface and another rule to determine whether or not the field must be flagged as a validation error (fields which are not visible are not subject to validation). However, this separation need not be applied; the visibility and validation rules may be combined into a single rule without extending beyond the scope of the present invention. The separation is used in the example implementation since it allows for greater extensibility of the business rules. For example, if the visibility and validation rules are separate, it is easier for the BRMS developer to create and integrate additional validation rules for a given data field.

Figure 2:
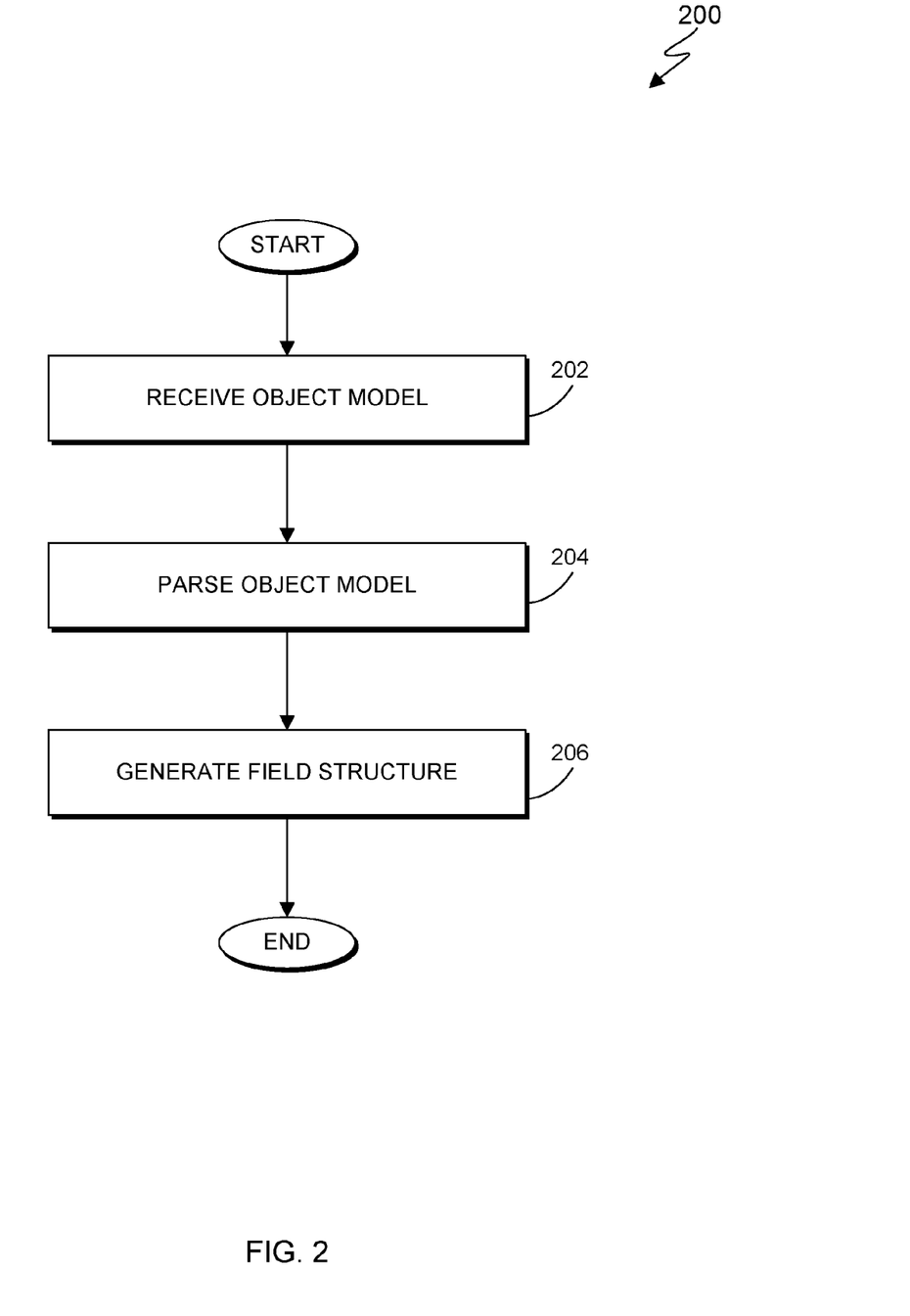
FIG. 2 is a flowchart depicting operational steps of the model parsing process, in accordance with an embodiment of the present invention.

FIG. 2 is a flowchart, 200, depicting operational steps of the model parsing process, in accordance with an embodiment of the present invention.

In step 202, model parser 120 receives an object model. An example of a Java object model is as follows, however, it should be appreciated that any programming or modeling language can be used:

```
package com.ibm.services;
public class Customer {
    public Customer ( ) { }
    public String fullName = "";
    public String accountNumber = "";
```

In step 204, model parser 120 parses the object model.

In step 206, model parser 120 generates a field structure. In this exemplary embodiment, the field structure is a list containing a field entry for each field in the object model. Each field entry has a field key, or a business friendly adaption of the field name in the object model. For example, each field entry has the following properties: the field name; the field verbalization; the field type; the class name; the class verbalization; the class package; a unique field key, to identify this field; the rule name (place holder, left blank at this stage); the rule package (place holder, left blank at this stage). For example, these field keys will be used to reference the corresponding field entry in the business rule:

```
Field Structure:
    Field Entry:
        Field Name: fullName
        Field Verbalization: the full name
        Field Type: String
        Class Name: Customer
        Class Verbalization: the customer
        Class Package: com.ibm.services
        Field Key: Full Name
        Rule Name:
        Rule Package:
    Field Entry:
        Field Name: accountNumber
        Field Verbalization: the account number
        Field Type: String
        Class Name: Customer
        Class Verbalization: the customer
        Class Package: com.ibm.services
        Field Key: Account Number
        Rule Name:
        Rule Package:
```

Accordingly, by performing the operational steps of FIG. 2, model parser 120 parses an object model and generates a field structure.

Figure 3:
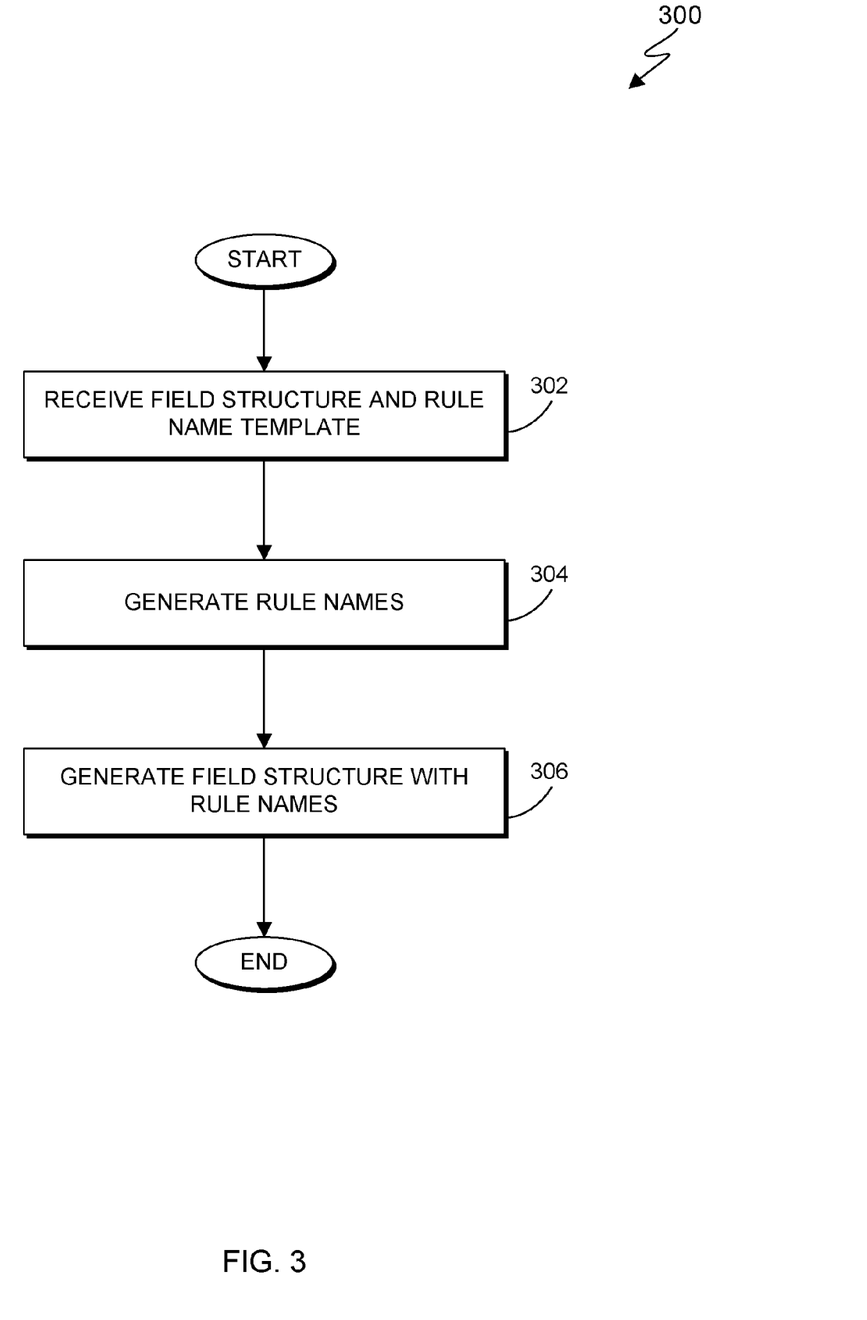
FIG. 3 is a flowchart depicting operational steps of the validation rule name generation process, in accordance with an embodiment of the present invention.

FIG. 3 is a flowchart, 300, depicting operational steps of the validation rule name generation process, in accordance with an embodiment of the present invention.

In step 302, validation rule name generator 130 receives the field structure from model parser 120 and also receives a rule name template from a user. An example rule name template for a validation rule is shown below, with parameter to be replaced from the field entry's data shown between square brackets:

```
Template for Rule Name:
"Validate [Field Key]"
Template for Package Name:
"[Class Name]"
```

In step 304, validation rule name generator 130 generates rule names for each entry in the field structure. In this exemplary embodiment, the rule name field is filled with a generated value that is based on the field name and the rule name template. For example, the rule name template might specify that the rule name is comprised of the word "Validate"+Class name+space+field name with each word separated by a space and started with a capital letter. Based on this example, the rule name for the field Customer.fullName becomes "Validate Customer Full Name." The rule package field is deduced from the class name and/or the package of the class that contains this data field. The rule package generation process is also part of the rule name template and is generated by substantially the same process as the rule name generation.

In step 306, validation rule name generator 130 generates a field structure with the rule names generated in step 304. The field structure with rule name generated from the examples above is shown below:

```
Field Structure:
    Field Entry:
        Field Name: fullName
        Field Verbalization: the full name
        Field Type: String
        Class Name: Customer
        Class Verbalization: the customer
        Class Package: com.ibm.services
        Field Key: Full Name
        Rule Name: Validate Full Name
        Rule Package: Customer
    Field Entry:
        Field Name: accountNumber
        Field Verbalization: the account number
        Field Type: String
        Class Name: Customer
        Class Verbalization: the customer
        Class Package: com.ibm.services
        Field Key: Account Number
        Rule Name: Validate Account Number
        Rule Package: Customer
```

Accordingly, by performing the operational steps of FIG. 3, validation rule name generator 130 generates a field structure with rule names.

Figure 4:
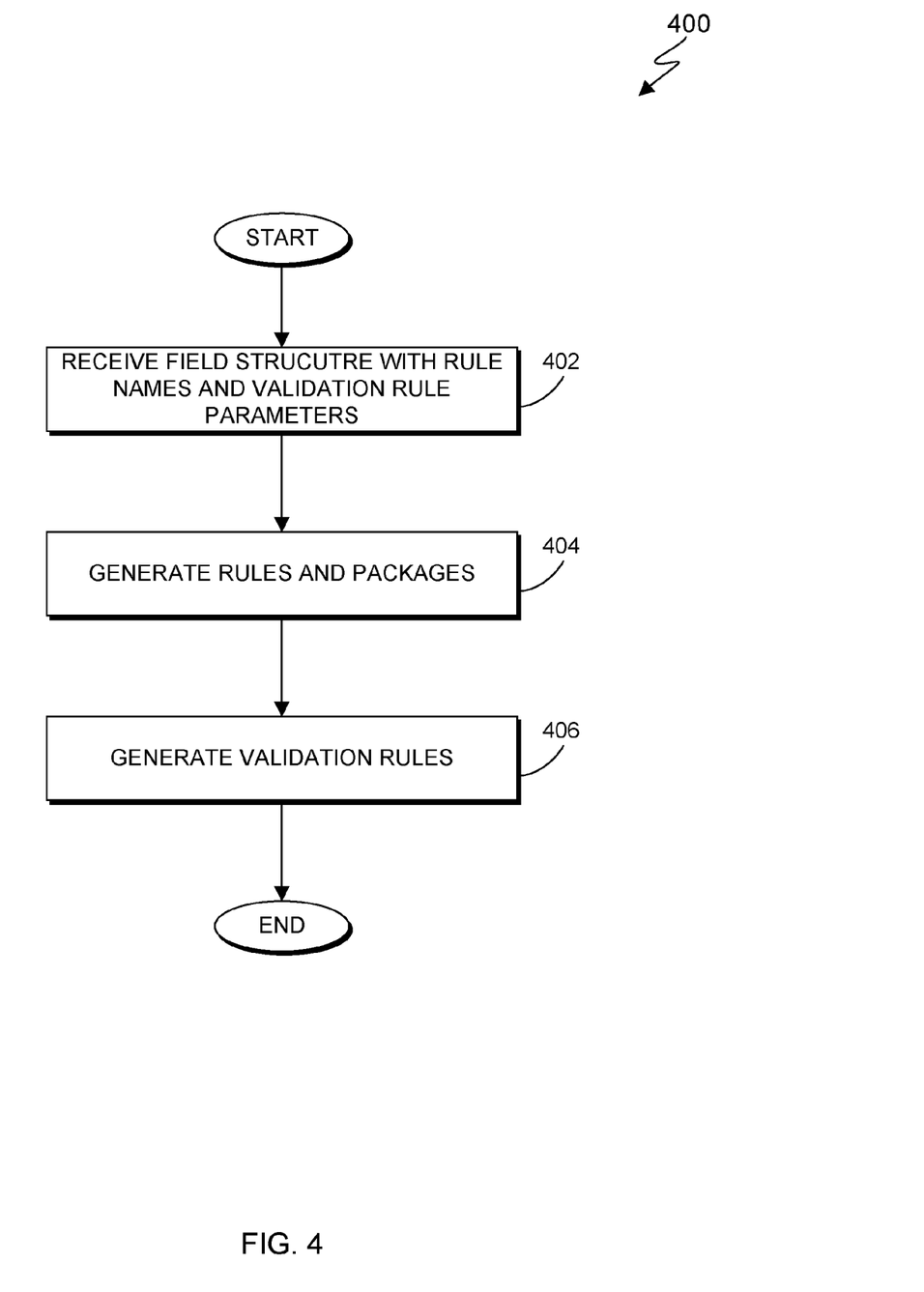
FIG. 4 is a flowchart depicting operational steps of the validation rule generation process, in accordance with an embodiment of the present invention.

FIG. 4 is a flowchart, 400, depicting operational steps of the validation rule generation process, in accordance with an embodiment of the present invention.

In step 402, validation rule generator 140 receives the field structure with rule names from validation rule name generator 130 and also receives validation rule parameters from a user. In this exemplary embodiment, the validation rule parameters are used to shape the generated rule for this field. The validation rule parameters include the validation rule template, which defines the general structure of the validation rule to be generated. The validation rule parameters also include the validation error message template (if this rule is to return a message), which specifies the text of the validation error message to be generated in case a validation error is caught in the rule. The validation error message template also specifies the parameters used to construct the message (if any). An example validation rule template is shown below, with parameters to be replaced during rule generation come from the field structure with rule names and are shown between square brackets:

```
"set 'current key' to "[Field Key]";
if
    all of the following conditions are true:
        -the field with key 'current key' is required
        -[field verbalization] of [class verbalization] is empty
then
    add a validation error with key: 'current key' and message "[field verbalization] of [class verbalization] can not be empty" to the validation response;"
```

In step 404, validation rule generator 140 generates validation rules and packages. In this exemplary embodiment, the text of a validation rule is generated based on the field name and the validation rule parameters. The validation package is created in the BRMS and the corresponding folder is created on the file system. A file is created on the output file system with a folder structure that corresponds to the rule package, and the file name is the same as the rule name. The text of the rule is saved in the rule file, which is created under the rule package, and the rule is added to the BRMS.

In step 406, validation rule generator 140 generates the validation rules, with all the rules to validate the object model organized in hierarchical rule package structure. The final validation rule project structure from the example validation rule template above is shown below:

```
Validation Rules Project
    rules
        Customer
            Validate Account Number
            Validate Full Name
```

Below is an example of the validation of the rule project structure shown above:

```
Validate Account Number:
definitions
    set 'current key' to "Account Number";
if
    all of the following conditions are true:
        -the field with key 'current key' is required
        -the account number of the customer is empty
then
    add a validation error with key: 'current key' and message "The
    Account Number of the customer can not be empty" to the validation
    response;
Validate Full Name:
definitions
    set 'current key' to "Full Name";
if
    all of the following conditions are true:
        -the field with key 'current key' is required
        -the full name of the customer is empty
then
    add a validation error with key: 'current key' and message "The Full
    Name of the customer can not be empty" to the validation response;
```

Accordingly, by performing the operational steps of FIG. 4, validation rule generator 140 generates a field structure with rule names.

Figure 5:
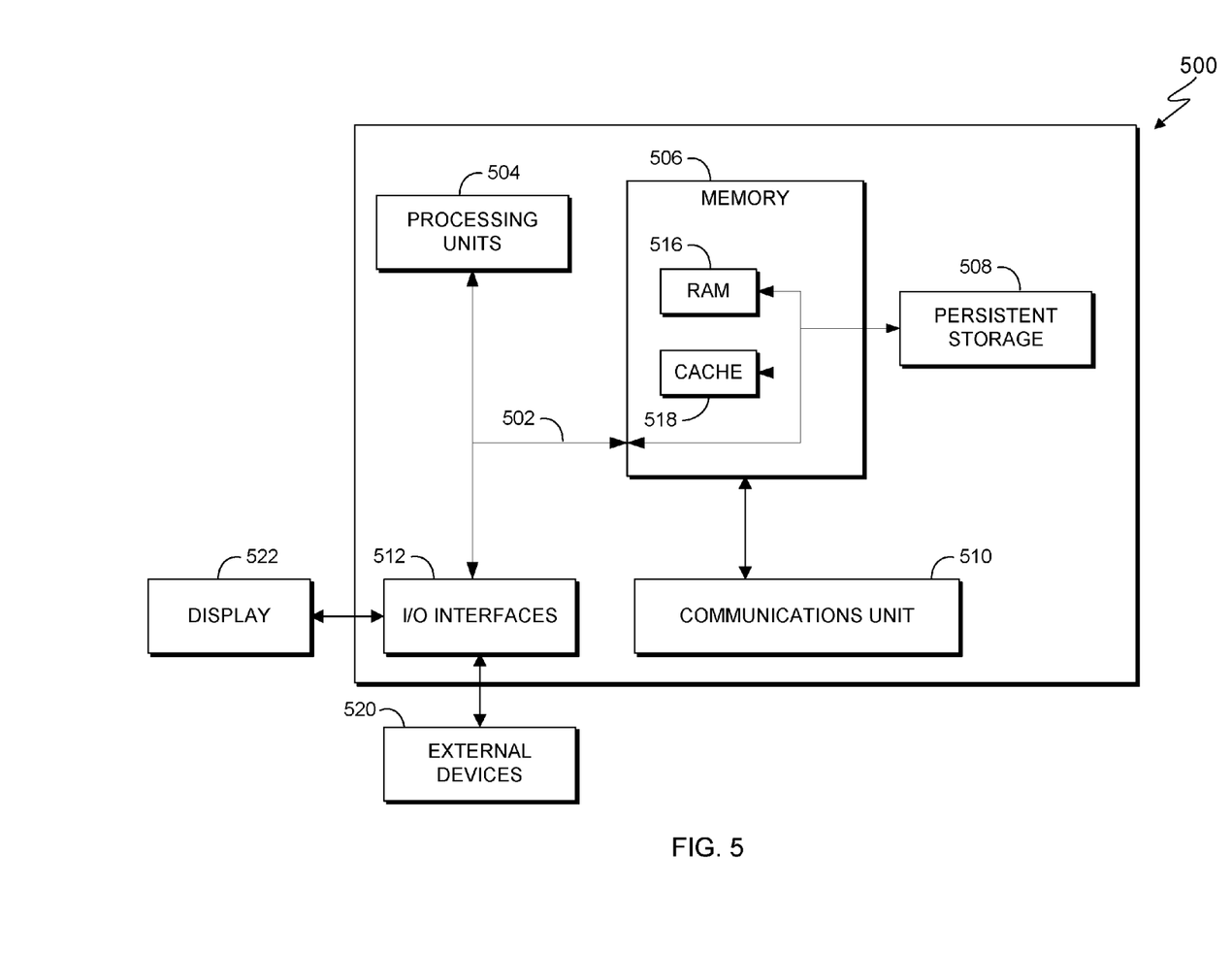
FIG. 5 is a block diagram of internal and external components of the computing device of FIG. 1, in accordance with an embodiment of the present invention.

FIG. 5 is a block diagram of internal and external components of computing device 500, which is representative of the computing device of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 500 includes communications fabric 502, which provides for communications between one or more processing units 504, memory 506, persistent storage 508, communications unit 510, and one or more input/output (I/O) interfaces 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 516 and cache memory 518. In general, memory 506 can include any suitable volatile or non-volatile computer readable storage media. Software is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer readable storage medium that is also part of persistent storage 508.

Communications unit 510 provides for communications with other computer systems or devices via a network. In this exemplary embodiment, communications unit 510 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present invention can be downloaded to computing device 500 through communications unit 510 (i.e., via the Internet, a local area network, or other wide area network). From communications unit 510, the software and data can be loaded onto persistent storage 508.

One or more I/O interfaces 512 allow for input and output of data with other devices that may be connected to computing device 500. For example, I/O interface 512 can provide a connection to one or more external devices 520 such as a keyboard, computer mouse, touch screen, virtual keyboard, touch pad, pointing device, or other human interface devices. External devices 520 can also include portable computer readable storage media such as, for example, thumb drives, portable optical or magnetic disks, and memory cards. I/O interface 512 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for generating object model validation rules in hierarchical structure based on said object models structure, said method comprising:
   receiving, by one or more computer processors, an object model;
   generating, by one or more computer processors, based, at least in part, on said object model, a first field structure, wherein said first field structure is generated by a model parser;
   generating, by one or more computer processors, based, at least in part, on said generated first field structure, a second field structure; and
   generating, by one or more computer processors, based, at least in part, on said generated second field structure, a set of validation rules based on said object model, wherein said set of validation rules comprise a validation rule to perform a data field check and a validation rule to control display of detected validation errors, and wherein said set of validation rules has a user friendly name generated based on a parsed object model and corresponding field keys.

2. The method of claim 1, wherein generating said second field structure comprises:
   receiving, by one or more computer processors, a rule name template;
   receiving, by one or more computer processors, said first field structure; and
   generating, by a validation rule name generator, said second field structure from said rule name template and the first field structure.

3. The method of claim 2, wherein said second field structure comprises a set of rule names.

4. The method of claim 1, wherein generating said set of validation rules comprises:
   receiving, by one or more computer processors, said second field structure;
   receiving, by one or more computer processors, validation rule parameters; and
   generating, by a validation rule generator, said set of validation rules from said second field structure and said validation rule parameters.

5. The method of claim 1, wherein said object model comprises one or more data fields.

6. The method of claim 5, wherein said one or more data fields are identified by a field key.

7. The method of claim 1, wherein said first field structure and second field structure comprise a field entry for each field in said object model, wherein each field entry comprises: a field key, a field name, a field verbalization, a field type, a class name, a class verbalization, a class package, a unique field key, said rule name, and said rule package.

8. The method of claim 1, wherein said model parser iterates on said contents of said object model and identifies said data fields in said object model, and uniquely identifies each of said data fields with a field key.

9. A computer program product for generating object model validation rules in hierarchical structure based on said object models structure, said computer program product comprising:
   a computer readable storage medium and program instructions stored on said computer readable storage medium, said program instructions comprising:
   program instructions to receive an object model;
   program instructions to generate, based, at least in part, on said object model, a first field structure wherein said first field structure is generated by a model parser;
   program instructions to generate, based, at least in part, on said generated first field structure, a second field structure; and
   program instructions to generate, based, at least in part, on said generated second field structure, a set of validation rules based on said object model, wherein said set of validation rules comprise a validation rule to perform a data field check and a validation rule to control display of detected validation errors, and wherein said set of validation rules has a user friendly name generated based on a parsed object model and corresponding field keys.

10. The computer program product of claim 9, wherein said program instructions to generate said second field structure comprises:
    program instructions to receive a rule name template;
    program instructions to receive said first field structure; and
    program instructions to generate said second field structure from said rule name template and said first field structure.

11. The computer program product of claim 10, wherein said second field structure comprises a set of rule names.

12. The computer program product of claim 9, wherein said program instructions to generate said set of validation rules comprises:
    program instructions to receive said second field structure;
    program instructions to receive validation rule parameters; and
    program instructions to generate said set of validation rules from said second field structure and said validation rule parameters.

13. The computer program product of claim 9 wherein said object model comprises one or more data fields.

14. The computer program product of claim 13, wherein said one or more data fields are identified by a field key.

15. A computer system for generating object model validation rules in hierarchical structure based on said object models structure, said computer system comprising:
- one or more computer processors;
- one or more computer readable storage media;
- program instructions stored on said computer readable storage media for execution by at least one of said one or more computer processors, said program instructions comprising:
  - program instructions to receive an object model;
  - program instructions to generate, based, at least in part, on said object model, a first field structure wherein said first field structure is generated by a model parser;
  - program instructions to generate, based, at least in part, on said generated first field structure, a second field structure; and
- program instructions to generate, based, at least in part, on said generated second field structure, a set of validation rules based on said object model, wherein said set of validation rules comprise a validation rule to perform a data field check and a validation rule to control display of detected validation errors, and wherein said set of validation rules has a user friendly name generated based on a parsed object model and corresponding field keys.

16. The computer system of claim 15, wherein said program instructions to generate said second field structure comprises:
- program instructions to receive a rule name template;
- program instructions to receive said first field structure; and
- program instructions to generate said second field structure from said rule name template and said first field structure.

17. The computer system of claim 16, wherein said second field structure comprises a set of rule names.

18. The computer system of claim 15, wherein said program instructions to generate said set of validation rules comprises:
- program instructions to receive said second field structure;
- program instructions to receive validation rule parameters; and
- program instructions to generate said set of validation rules from said second field structure and said validation rule parameters.

19. The computer system of claim 15, wherein said object model comprises one or more data fields.

* * * * *